Nov. 10, 1931.   P. B. MOORE ET AL   1,831,507
WINDSHIELD VENTILATOR
Filed June 3, 1929   2 Sheets-Sheet 1

INVENTORS
Paul B. Moore
and Bennett Lewis
BY Bacon & Thomas
ATTORNEYS

Nov. 10, 1931.　　P. B. MOORE ET AL　　1,831,507
WINDSHIELD VENTILATOR
Filed June 3, 1929　　2 Sheets-Sheet 2
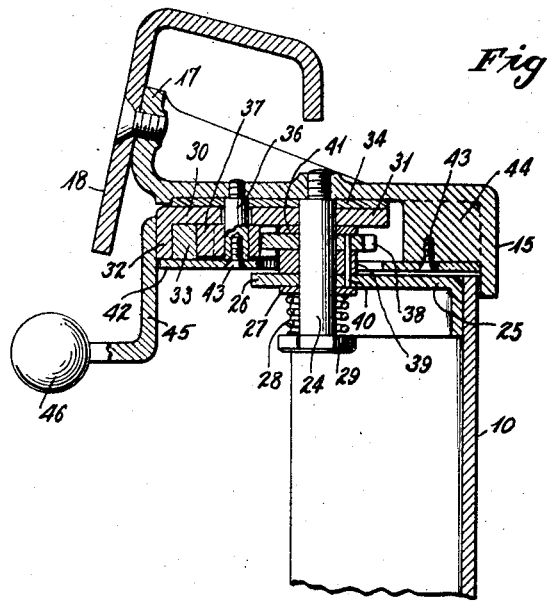
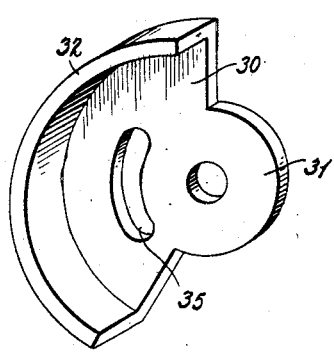
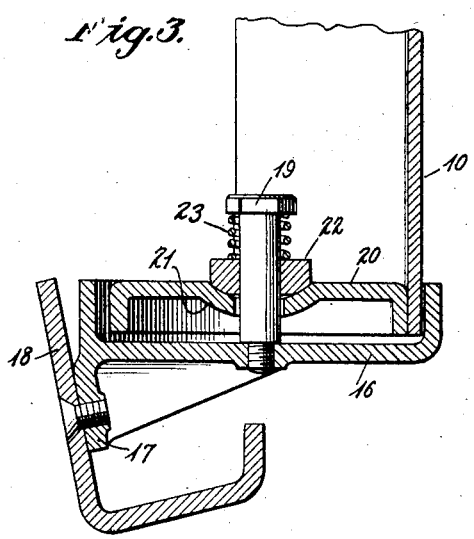
INVENTORS
Paul B. Moore
and Bennett Lewis
BY
Bacon & Thomas
ATTORNEYS Patented Nov. 10, 1931

1,831,507

UNITED STATES PATENT OFFICE

PAUL B. MOORE AND BENNETT LEWIS, OF INDIANAPOLIS, INDIANA, ASSIGNORS TO MARTIN-PARRY CORPORATION, OF YORK, PENNSYLVANIA, A CORPORATION OF DELAWARE

WINDSHIELD VENTILATOR

Application filed June 3, 1929. Serial No. 368,064.

This invention relates to windshield ventilators, and more particularly to devices of this character which are pivotally mounted in or near the plane of the windshield and adapted to be swung outwardly about their pivot by operating mechanism having a handle located inside the plane of the windshield.

It is the general object of the invention to simplify and improve the construction and operation of devices of this character.

A further object of the invention is to provide a planetary gear drive from the operating handle to the ventilator.

Still another object of the invention is to provide an operating means having an operating handle movable in a plane perpendicular to the pivotal axis of the ventilator.

A further object of the invention is to provide, in combination with the operating means, a friction brake for taking care of weaving strains.

A specific object of the invention is to provide an operating means having an operating handle whereby upward movement of the operating handle would cause an upward movement of the ventilator.

Other objects and features of novelty will be apparent as the following description proceeds, as taken in connection with the accompanying drawings in which:

Fig. 2 is a horizontal cross section through the axis of the ventilator, being taken along the line 2—2 of Fig. 1.;

Fig. 3 is a detail view similar to Fig. 2, but taken at the other end of the ventilator;

Fig. 4 is a detail perspective view of one of the elements of the ventilator operating mechanism.

Figure 1:
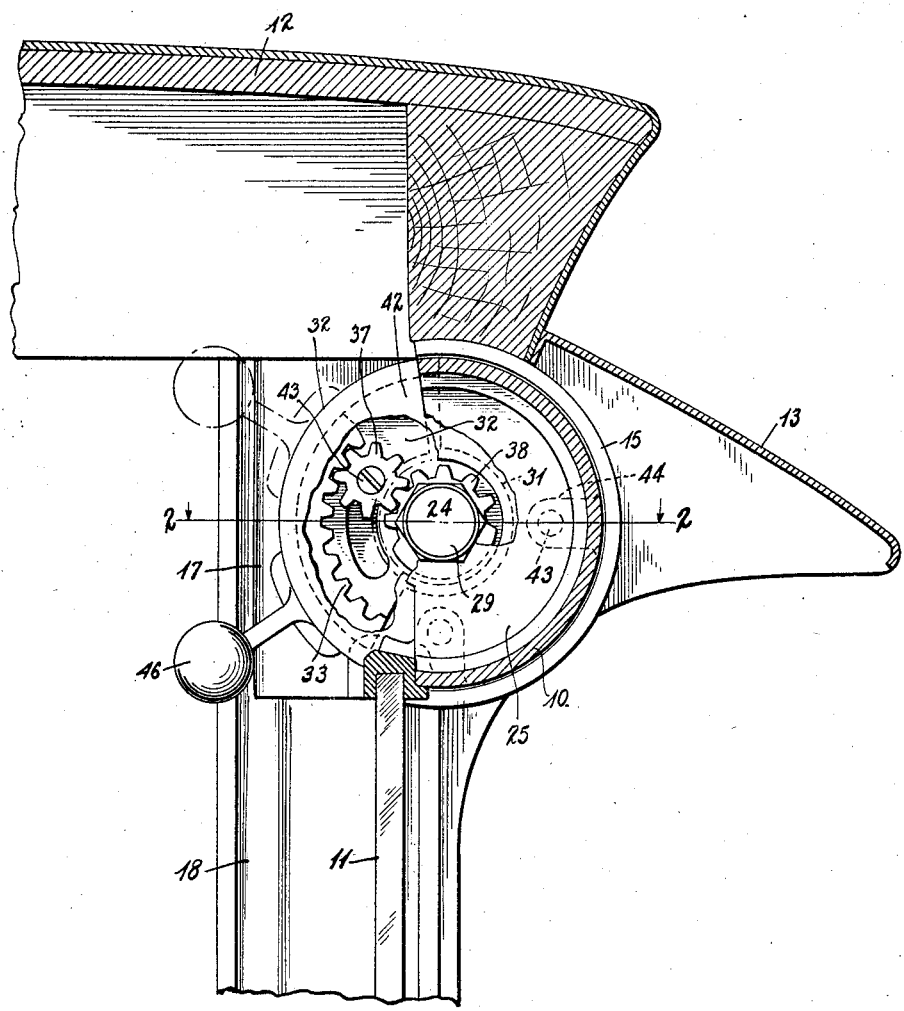
Fig. 1 is a vertical cross section through the upper portion of the windshield and top of an automobile provided with a ventilator regulator according to the present invention.

Referring more particularly to the drawings for a detailed description of one embodiment of the invention, there is disclosed a ventilator 10 which comprises a semi-cylindrical member horizontally mounted and pivoted at its axis above and slightly in front of a windshield 11, below the top 12, and in position to be shielded by the visor 13.

The ventilator 10 is supported by housings 15 and 16 respectively mounted at the opposite ends thereof, each having a flange 17 by which it may be secured to the body windshield pillar 18. The housing 16 is provided with a stud 19 on which is centrally pivoted a flanged disk 20, to the flange of which the right-hand end of the ventilator 10 is rigidly secured. The central portion of the disk 20 is dished as at 21 to receive a friction bearing 22 which is resiliently held in place by a spring 23.

The housing 15 which incloses the left-hand end of the ventilator 10 also encloses the operating mechanism. This housing also carries a stud 24 on which is pivotally mounted a flanged member 25 which is generally semi-circular in shape and to the flange of which the ventilator 10 is rigidly secured. The member 25 has an ear portion 26 extending around the pivot point, and bearing against the portion 26 is a friction bearing collar 27 which is urged thereagainst by a helical spring 28 surrounding the stud 24 under the hexagonal head 29 thereof. Also pivoted on the stud 24 is an operating member 30 which is also generally semi-circular in form and provided with an ear 31 which surrounds the stud 24. The member 30 is flanged as at 32 and is provided with an annular or segmental rack 33 extending inwardly from the flange 32. A liner 34 of bearing material is fitted between the housing 15 and the member 30 and extends over the path thereof.

The member 30 is provided with an elongated arcuate slot 35 to receive a smaller stud 36 which is threaded in the housing 15 approximately midway between the stud 24 and the flange 32 and located slightly above the horizontal axis of the ventilator 10. A pinion 37 is journaled on the stud 36 and meshes with the teeth of the segmental rack 33.

A pinion 38 is journaled on the stud 24 between the ear 31 of the member 30, and the supporting member 25 of the ventilator 10. A spacing collar 39 is interposed between the pinion 38 and the ear 26 of the member 25, and these three elements are rigidly secured together by pins 40. A washer 41 is interposed between the pinion 38 and the ear 31. The pinion 38 which is rigidly mounted with respect to the ventilator 10, meshes with the pinion 37 journaled on the stud 36, which in turn meshes with the rack 33.

A centrally apertured cover plate 42 is fitted over the operating member 30 and is secured as by means of machine screws 43 to the stud 36 and to bosses 44 extending inwardly from the housing 15. The member 30 is provided with an offset operating handle 45 terminating in an operating knob 46.

In operation, referring to Fig. 1, the parts being in the closed position, the knob 46 is moved upwardly to open the ventilator 10. This will impart a clock-wise motion to the segmental rack 33 which will cause a clockwise motion of the pinion 37 about its stationary pivot 36. The pinion 38 will accordingly be rotated counter-clockwise, and this pinion being rigid with the ventilator 10 will swing the ventilator counter-clockwise about the stud 24 and thus open the ventilator. It should be noted that the pinion 38 need not be completely cut, as teeth are necessary only on the upper side thereof as viewed in Fig. 1.

It will thus be obvious that in the specific preferred embodiment of the invention illustrated and described, upward movement of the knob 46 causes an upward movement of the ventilator 10 and that the knob 46 is rotated in a direction opposite to the direction of the ventilator 10 when it swings to open position. The broader aspect of the invention, however, is not limited to upward movement of the knob for opening the ventilator, or to movement of the operating handle in a direction opposite to the direction of the ventilator 10.

The construction of the right hand end as shown in Fig. 3, serves to frictionally hold the ventilator in various positions of adjustment, and is important because of its ability to take care of weaving strains. Furthermore, this construction also serves as a friction braking means to insure smooth operation of the operating gear.

The scope of the invention is not limited to the details shown and described, but includes such modifications of the broader phase thereof as come within the scope of the appended claims.

Having thus described our invention, what we claim is:

1. In combination with a windshield ventilator mounted on a pivotal axis and adapted to swing thereabout in one direction to open the ventilator, operating means for opening said ventilator including a handle having its pivot point spaced from the ventilator in a direction axially of the latter and movable in the opposite direction in a plane perpendicular to the pivoted axis, and means for transmitting movement of the handle to the ventilator.

2. In combination with a windshield ventilator mounted near the plane of the windshield and adapted to be moved upwardly outside the plane of the windshield operating means including a handle having its pivot point spaced from the ventilator in a direction axially of the latter and adapted to be moved upwardly inside the windshield to cause a corresponding upward movement of the ventilator outside of the windshield, and means for transmitting movement of the handle to the ventilator.

3. In combination with a windshield ventilator adapted to swing upwardly, operating mechanism including a handle operated from inside the windshield out of direct contact with the ventilator but having its pivot point coaxial therewith, said mechanism being actuated by movement of said handle for swinging the ventilator upwardly by an upward movement of said handle.

4. In combination with a semi-cylindrical windshield ventilator loosely mounted on a pivotal stud and adapted to swing thereabout in one direction to open the ventilator, operating means including a handle pivoted about the same stud as the ventilator and spaced from the latter for actuating the ventilator, said means being operable to open the ventilator by movement of said handle in the opposite direction about said pivotal stud.

5. In combination with a windshield ventilator mounted on a pivotal axis and adapted to swing thereabout in one direction to open the ventilator, operating means for opening said ventilator including a handle detached from the ventilator and movable in the opposite direction in a plane perpendicular to the pivotal axis, said operating means comprising a pinion coaxial with said ventilator, a planetary pinion meshing therewith, and an annular segment meshing with said planetary pinion.

6. In combination with a windshield ventilator, comprising a semi-cylindrical member mounted on a pivotal axis, a housing enclosing one end of said member, an operating member including a manually actuated segmental rack pivoted within said housing, and a pinion fixed with respect to the housing and meshing with said rack adapted to actuate said ventilator member in response to movement of said operating member.

7. In combination with a windshield ventilator comprising a semi-cylindrical member mounted on a pivotal axis, a housing enclosing one end of said member, an operating member including a segmental rack pivoted on said housing, and a gear meshing with said rack adapted to actuate said ventilator member in response to movement of said operating member, said gear having a stationary pivot secured to said housing.

8. In combination with a windshield ventilator loosely mounted on a pivotal stud and adapted to rotate thereabout in one direction to open the ventilator, operating means for opening said ventilator including a handle loosely mounted on the same stud and spaced from the ventilator for rotary movement in the opposite direction in a plane perpendicular to the pivotal axis, said operating means also including planetary gearing for causing movement of said handle to produce rotary movement of said ventilator.

9. In combination with a windshield ventilator comprising a semi-cylindrical member mounted on a pivotal axis, a housing enclosing one end of said member, an operating member including a segmental rack pivoted on said housing, and a gear meshing with said rack adapted to actuate said ventilator member in response to movement of said operating member, said segmental rack being provided with an elongated slot, and said gear having a stationary pivot extending through said slot.

10. In a windshield ventilator movable around a horizontal axis and including a semi-circular body, means for operating the ventilator including a crank type of operating handle movable around a horizontal axis separate from the ventilator, and meshing gears for transmitting motion of the handle to the ventilator, in combination with friction braking means for controlling the operation of the ventilator.

In testimony whereof we affix our signatures.

PAUL B. MOORE.
BENNETT LEWIS.